US012738191B2

(12) United States Patent
Zhu

(10) Patent No.: US 12,738,191 B2
(45) Date of Patent: Sep. 15, 2026

(54) DISPLAY PANEL

(71) Applicant: Guangzhou China Star Optoelectronics Semiconductor Display Technology Co., Ltd., Guangzhou (CN)

(72) Inventor: Maoxia Zhu, Guangzhou (CN)

(73) Assignee: Guangzhou China Star Optoelectronics Semiconductor Display Technology Co., Ltd., Guangzhou (CN)

( * ) Notice: Subject to any disclaimer, the term of this patent is extended or adjusted under 35 U.S.C. 154(b) by 0 days.

(21) Appl. No.: 18/820,445

(22) Filed: Aug. 30, 2024

(65) Prior Publication Data

US 2025/0087129 A1 Mar. 13, 2025

(30) Foreign Application Priority Data

Sep. 7, 2023 (CN) ........................ 202311156473.6

(51) Int. Cl.
*G09G 3/20* (2006.01)
*G09G 3/3233* (2016.01)

(52) U.S. Cl.
CPC ......... *G09G 3/2077* (2013.01); *G09G 3/2011* (2013.01); *G09G 3/2018* (2013.01);
(Continued)

(58) Field of Classification Search
CPC .. G09G 3/2018; G09G 3/2077; G09G 3/2011; G09G 3/3233; G09G 2320/0242;
(Continued)

(56) References Cited

U.S. PATENT DOCUMENTS 7,652,644 B2 * 1/2010 Lee .......................... G09G 3/22 345/76
7,796,100 B2 * 9/2010 Kim ..................... G09G 3/3233 345/204

(Continued)

FOREIGN PATENT DOCUMENTS

CN 101086820 A 12/2007
CN 108694908 A 10/2018

(Continued)

OTHER PUBLICATIONS

Chinese Office Action issued in corresponding Chinese Patent Application No. 202311156473.6 dated Jul. 2, 2026, pp. 1-7.

*Primary Examiner* — Olga V Merkoulova
(74) *Attorney, Agent, or Firm* — Nathan & Associates Patent Agents Ltd.; Menachem Nathan

(57) ABSTRACT

The application provides a display panel including a data signal modulation module, a light-emitting device, and a pixel driving circuit. The light-emitting device is electrically connected in a loop formed by a first power supply terminal and a second power supply terminal of the pixel driving circuit. The data signal modulation module is electrically connected to the first data signal terminal of the pixel driving circuit. The data signal modulation module is configured to obtain a pending grayscale value for the light-emitting device to display, and to adjust a duty cycle and a voltage value of the data signal that makes the light-emitting device to emit light according to the pending grayscale value, ensuring that the light-emitting device can stably display multiple grayscale values.

9 Claims, 7 Drawing Sheets

(52) U.S. Cl.
CPC ... *G09G 3/3233* (2013.01); *G09G 2300/0819* (2013.01); *G09G 2300/0842* (2013.01); *G09G 2310/08* (2013.01); *G09G 2320/0233* (2013.01); *G09G 2320/0242* (2013.01); *G09G 2320/0247* (2013.01); *G09G 2330/02* (2013.01)

(58) Field of Classification Search
CPC ... G09G 2300/0819; G09G 2300/0842; G09G 2330/02; G09G 2320/0247; G09G 2310/08
See application file for complete search history.

(56) References Cited

U.S. PATENT DOCUMENTS

| | | | | |
|---|---|---|---|---|
| 8,120,555 | B2 * | 2/2012 | Cok | G09G 3/3233 345/55 |
| 9,773,443 | B2 * | 9/2017 | Limketkai | G09G 3/3233 |
| 10,504,406 | B2 * | 12/2019 | Shigeta | G09G 3/2081 |
| 10,699,626 | B2 * | 6/2020 | Kim | G09G 3/3688 |
| 10,706,766 | B2 * | 7/2020 | Kim | G09G 3/32 |
| 10,713,996 | B2 * | 7/2020 | Kim | H01L 25/167 |
| 10,825,380 | B2 * | 11/2020 | Kim | G09G 3/2003 |
| 11,398,181 | B2 * | 7/2022 | Kim | G09G 3/32 |
| 11,790,836 | B2 * | 10/2023 | Kim | G09G 3/2014 345/691 |
| 11,810,522 | B2 * | 11/2023 | Byun | G09G 3/32 |
| 11,837,157 | B2 * | 12/2023 | Oh | G09F 9/302 |
| 11,961,461 | B2 * | 4/2024 | Kim | G09G 3/12 |
| 2007/0279345 | A1 * | 12/2007 | Kim | G09G 3/3233 345/80 |
| 2009/0115703 | A1 * | 5/2009 | Cok | G09G 3/3233 345/76 |
| 2014/0362062 | A1 * | 12/2014 | Limketkai | G09G 3/3233 345/82 |
| 2018/0293929 | A1 * | 10/2018 | Shigeta | G09G 3/3233 |
| 2019/0371231 | A1 * | 12/2019 | Kim | G09G 3/32 |
| 2020/0111403 | A1 * | 4/2020 | Kim | G09G 3/2081 |
| 2020/0111404 | A1 * | 4/2020 | Kim | G09G 3/2014 |
| 2021/0183321 | A1 * | 6/2021 | Pyo | G09G 3/3291 |
| 2021/0210003 | A1 * | 7/2021 | Kim | G09G 3/2014 |
| 2022/0301501 | A1 * | 9/2022 | Oh | G06F 3/1446 |
| 2022/0327995 | A1 * | 10/2022 | Kim | G09G 3/2014 |
| 2023/0162666 | A1 * | 5/2023 | Kim | G09G 3/2081 345/82 |
| 2023/0230550 | A1 * | 7/2023 | Byun | G09G 3/3291 345/204 |
| 2025/0087129 | A1 * | 3/2025 | Zhu | G09G 3/2018 |

FOREIGN PATENT DOCUMENTS

| | | | |
|---|---|---|---|
| CN | 114267281 | A | 4/2022 |
| KR | 20060127356 | A | 12/2006 |

* cited by examiner

DISPLAY PANEL

CROSS-REFERENCE TO RELATED APPLICATIONS

The present application claims priority to Chinese Patent Application No. 202311156473.6, filed on Sep. 7, 2023, the content of which is incorporated herein by reference in its entirety.

TECHNICAL FIELD

The present application relates to display technology, particularly to a display panel.

BACKGROUND

Organic Light-Emitting Diodes (OLEDs), Mini Light-Emitting Diodes (Mini-LEDs), and Micro Light-Emitting Diodes (Micro-LEDs) are light-emitting devices that may exhibit color biases and unstable luminous wavelengths when driven using Pulse Amplitude Modulation (PAM) due to a low driving current required for low grayscale display. While driven using Pulse Width Modulation (PWM), these devices may suffer from brightness loss during high grayscale display.

To address these issues, related arts have proposed a hybrid driving method combining PAM and PWM to drive light-emitting devices, aiming to resolve the issues of color biases in low grayscale display and brightness loss in high grayscale display. Existing hybrid driving methods typically adopt a multi-sub-display period binary division method. For example, in an eight-sub-display period binary division method, the division is performed on the basis of a lighting duration of a light-emitting device during low grayscale display, such that PWM driving is performed for the 128 grayscale values (L0~L127) obtained through combinations in a first to seventh sub-display periods. For high grayscale display, the division is performed on the amplitude of the control signal, such that PAM driving is performed for the L128~L255 obtained through combinations in an eighth sub-display period. However, when using the eight-sub-display period binary division method to drive the light-emitting device to display high grayscales, the light-emitting device only emits light during the eighth sub-display period. A duty cycle of the light-emitting device is only about ⅛ of a duty cycle when using a non-hybrid driving method, resulting in the light-emitting device still having flicker issues when emitting light based on the hybrid driving method.

SUMMARY

The present application provides a display panel that can solve the flicker issue when light-emitting devices are driven using a hybrid driving method.

The present application provides a display panel, including a data signal modulation module, a light-emitting device, and a pixel driving circuit, wherein the light-emitting device is electrically connected in a loop formed by a first power supply terminal and a second power supply terminal of the pixel driving circuit, and the pixel driving circuit includes:

a driving transistor, a source of the driving transistor being electrically connected to the first power supply terminal, and a drain of the driving transistor being electrically connected to one terminal of the light-emitting device;

a first transistor, a gate of the first transistor being electrically connected to a first scanning signal terminal of the pixel driving circuit, a source of the first transistor being electrically connected to a first data signal terminal of the pixel driving circuit, and a drain of the first transistor being electrically connected to a gate of the driving transistor;

a storage capacitor, a first electrode plate of the storage capacitor being electrically connected to the gate of the driving transistor, and a second electrode plate of the storage capacitor being electrically connected to the drain of the driving transistor;

wherein, a display period of one frame displayed by the light-emitting device includes consecutive sub-display periods including at least a first sub-display period and a second sub-display period, the first scanning signal terminal is configured to receive, in any of the first and second sub-display periods, a first scanning signal turning on the first transistor; and the first data signal terminal is configured to receive, in at least the first sub-display period, a data signal controlling the driving transistor to turn on; and the data signal modulation module is electrically connected to the first data signal terminal and is configured to obtain a pending grayscale value for the light-emitting device to display, and to provide the data signal to the first data signal terminal based on the pending grayscale value.

In the display panel provided in the present application, the data signal modulation module is configured to obtain the pending grayscale value, and to determine whether the pending grayscale value is a first grayscale value, and configured to provide the data signal to the first data signal terminal in the first sub-display period when the pending grayscale value is the first grayscale value;

or, the data signal modulation module is configured to obtain the pending grayscale value, and to determine whether the pending grayscale value is a second grayscale value, and configured to provide the data signal to the first data signal terminal in both the first and the second sub-display periods when the pending grayscale value is the second grayscale value; and wherein, the second grayscale value is greater than a first grayscale threshold value, and the first grayscale value is less than or equal to the first grayscale threshold value.

In the display panel provided in the present application, the first grayscale value includes at least a first sub-grayscale value and a second sub-grayscale value, the first sub-grayscale value being less than the second sub-grayscale value;

the data signal modulation module is configured to provide a first data signal to the first data signal terminal in the first sub-display period when the first grayscale value is the first sub-grayscale value;

the data signal modulation module is configured to provide a second data signal to the first data signal terminal in the first sub-display period when the first grayscale value is the second sub-grayscale value; and wherein, a voltage value of the first data signal is less than a voltage value of the second data signal.

In the display panel provided in the present application, the second grayscale value includes at least a third sub-grayscale value and a fourth sub-grayscale value, the third sub-grayscale value being less than the fourth sub-grayscale value;

the data signal modulation module is configured to provide a third data signal to the first data signal terminal in both the first and the second sub-display periods when the second grayscale value is the third sub-grayscale value;

the data signal modulation module is configured to provide a fourth data signal to the first data signal terminal in both the first and the second sub-display periods when the second grayscale value is the fourth sub-grayscale value; and wherein, a voltage value of the third data signal is less than a voltage value of the fourth data signal.

In the display panel provided in the present application, the second grayscale value includes at least a third sub-grayscale value and a fourth sub-grayscale value, the third sub-grayscale value being less than the fourth sub-grayscale value;

the data signal modulation module is configured to provide a fifth data signal in the first sub-display period and a sixth data signal during the second sub-display period to the first data signal terminal when the second grayscale value is the third sub-grayscale value;

the data signal modulation module is configured to provide the fifth data signal during the first sub-display period and a seventh data signal during the second sub-display period to the first data signal terminal when the second grayscale value is the fourth sub-grayscale value; and wherein a voltage value of the fifth data signal is non-zero, and a voltage value of the sixth data signal is less than a voltage value of the seventh data signal.

In the display panel provided in the present application, the voltage value of the fifth data signal is the same as a voltage value of a first threshold data signal, the first threshold data signal is the data signal provided by the data signal modulation module to the first data signal terminal when the pending grayscale value is the first grayscale threshold.

In the display panel provided in the present application, the display period of the frame displayed by the light-emitting device further includes a third sub-display period, the first, second, and third sub-display periods being consecutive;

the data signal modulation module is further configured to obtain the pending grayscale value, and to determine whether the pending grayscale value is a third grayscale value, and configured to provide the data signal during the first, second, and third sub-display periods when the pending grayscale value is the third grayscale value; and wherein the third grayscale value is greater than a second grayscale threshold value, and the second grayscale value is greater than the first grayscale threshold value and less than or equal to the second grayscale threshold value.

In the display panel provided in the present application, durations of the first scanning signal turning on the first transistor are the same in any two of the sub-display periods.

In the display panel provided in the present application, in any one of the sub-display periods, a start time point of the data signal turning on the driving transistor is the same as a start time point of the first scanning signal turning on the first transistor, and an end time point of the data signal turning on the driving transistor is the same as an end time point of the first scanning signal turning on the first transistor conductive.

In the display panel provided in the present application, the pixel driving circuit further includes a second transistor, a gate of the second transistor is electrically connected to a second scanning signal terminal of the pixel driving circuit, a source of the second transistor is electrically connected to a second data signal terminal of the pixel driving circuit, and a drain of the second transistor is electrically connected to the gate of the driving transistor, the second scanning signal terminal is configured to output a second scanning signal turning on the second transistor during any one of the sub-display periods; and wherein a first time difference between a start time point of the second scanning signal in an nth sub-display period of the sub-display periods and an end time point of the first scanning signal in the nth sub-display period is less than a second time difference between a start time point of the second scanning signal in a (n+1)th sub-display period of the sub-display periods and an end time point of the first scanning signal in the (n+1)th sub-display period, where n is an integer greater than or equal to 1.

In the display panel provided by the present application, the pending grayscale value of the light-emitting device is obtained through the data signal modulation module, thereby at least in the first sub-display period of the display period of one frame displayed by the light-emitting device, the corresponding data signal may be provided to the first data signal terminal of the pixel driving circuit according to the pending grayscale value, and the first data signal terminal of the pixel driving circuit receives the data signal at least in the first sub-display period, thereby causing the light-emitting device to emit light at least during the first sub-display period. The display panel of this application adjusts and controls the duty cycle and the voltage value of the data signal that causes the light-emitting device to emit light, based on the data signal modulation module, to ensure that the light-emitting device can stably display multiple different grayscale values, thereby optimizing the display quality of the display panel.

DETAILED DESCRIPTION

The present application describes the technical solution in the context of the present application's embodiments, with reference to the accompanying drawings. The described embodiments are solely for the purpose of explaining the inventive concept and should not be considered as limiting the scope of protection of the present application.

Figure 1:
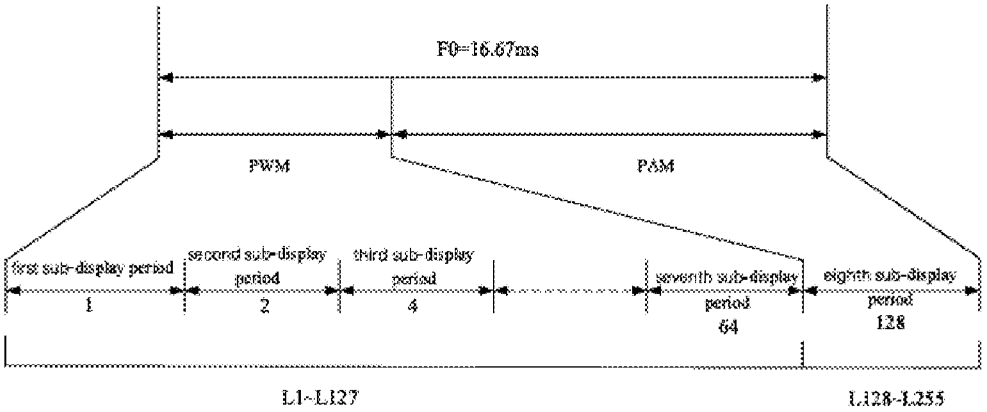
FIG. 1 (Prior Art)
FIG. 1 is a schematic diagram showing the allocation of the sub-display periods in one frame of the light-emitting device in the display panel in related arts.

As shown in FIG. 1, taking the example of the display panel with the refresh rate of 60 Hertz and the pixel driving circuit using an eight-sub-display period binary division method for hybrid PAM and PWM driving of the light-emitting device for illustration, the display period F0 of one frame is divided into eight sub-display periods. The first through the eighth sub-display periods follow one another, with the first through the seventh sub-display periods for PWM driving and the eighth sub-display period for PAM driving.

Figure 2:
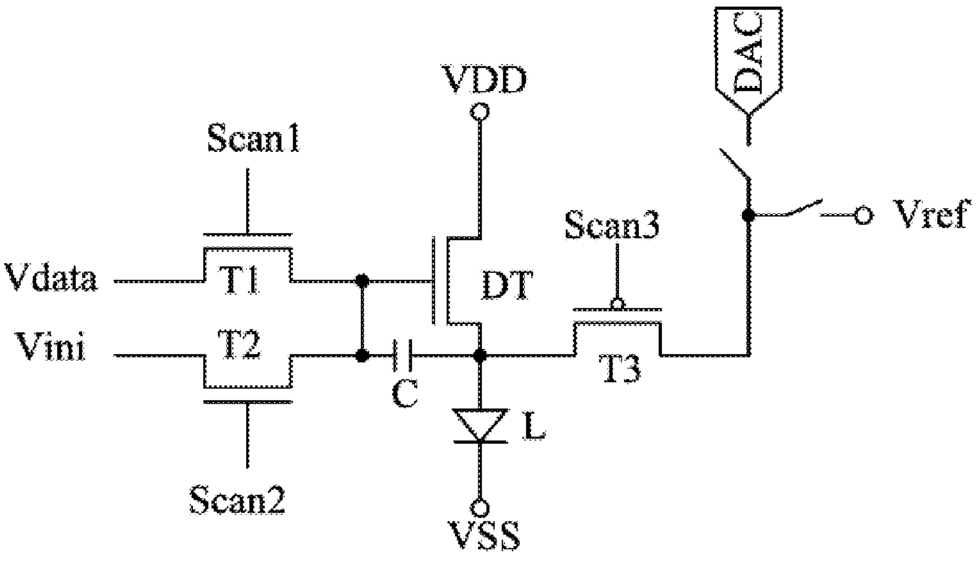
FIG. 2 (Prior Art)
FIG. 2 is a schematic diagram of the electrical connection between the pixel driving circuit and the light-emitting device in related arts.

As shown in FIG. 2, taking the 4T1C (four transistors and one storage capacitor) pixel driving circuit as an example, the hybrid driving based on the eight-sub-display period binary division method demonstrated in FIG. 1 is explained. The 4T1C pixel driving circuit includes the driving transistor DT, the first transistor T1, the second transistor T2, the third transistor T3, and the storage capacitor C.

The light-emitting device L is connected in series with the first power supply terminal VDD and the second power supply terminal VSS of the pixel driving circuit, forming the circuit loop.

The source of the driving transistor DT is electrically connected to the first power supply terminal VDD, and the drain of the driving transistor DT is electrically connected to one terminal of the light-emitting device L, thereby connecting the other terminal of the light-emitting device L to the second power supply terminal VSS. The source and the drain of the driving transistor DT are connected in series between the first power supply terminal VDD and the anode of the light-emitting device L. When the driving transistor DT is in the conductive state, it causes the light-emitting device L to emit light in the luminous circuit formed by the first power supply terminal VDD and the second power supply terminal VSS.

The gate of the first transistor T1 is electrically connected to the first scanning signal terminal Scan1 of the pixel driving circuit, the source of the first transistor T1 is electrically connected to the first data signal terminal Vdata of the pixel driving circuit, and the drain of the first transistor T1 is electrically connected to the gate of the driving transistor DT. When the first transistor T1 is in the conductive state, it outputs the data signal provided by the first data signal terminal Vdata to the gate of the driving transistor DT.

The first electrode plate of the storage capacitor C is electrically connected to the gate of the driving transistor DT, and the second electrode plate of the storage capacitor C is electrically connected to the drain of the driving transistor DT. The storage capacitor C stores the voltage at the gate of the driving transistor DT and the voltage at the drain of the driving transistor DT.

The gate of the second transistor T2 is electrically connected to the second scanning signal terminal Scan2 of the pixel driving circuit, the source of the second transistor T2 is electrically connected to the second data signal terminal Vini of the pixel driving circuit, and the drain of the second transistor T2 is electrically connected to the gate of the driving transistor DT. When the second transistor T2 is in the conductive state, it outputs the pull-down signal provided by the second data signal terminal Vini to the gate of the driving transistor DT to control the driving transistor DT to be in the cutoff state.

The gate of the third transistor T3 is electrically connected to the third scanning signal terminal Scan3, the source of the third transistor T3 is electrically connected to the external compensation device DAC, and also connected to the reset signal terminal Vref of the pixel driving circuit, and the drain of the third transistor T3 is electrically connected to the drain of the driving transistor DT. When the third transistor T3 is in the conductive state, it outputs the compensation signal provided by the external compensation device DAC or the reset signal provided by the reset signal terminal Vref to the drain of the driving transistor DT.

As shown in FIGS. 1 and 2, in the seven sub-display periods for PWM driving, the light-emitting device L has the luminous duration ratio of 1:2:4:8:16:32:64 in the first through the seventh sub-display periods. Driving the light-emitting device L to emit light correspondingly in the first through the seventh sub-display periods can realize the light-emitting device L to display any grayscale value from L1 to L127. For example, to realize the light-emitting device L to display L5, the light-emitting device L only needs to be driven to emit light in the first and third sub-display periods. For example, to realize the light-emitting device L to display L127, the light-emitting device L only needs to be driven to emit light in all the first through the seventh sub-display periods.

The 4T1C pixel driving circuit shown in FIG. 2 can adopt the combination of pulse amplitude modulation driving and pulse width modulation driving. The pixel driving circuit includes at least the data signal writing phase and the luminescence phase. In the data signal writing phase, the first transistor T1 is turned on, providing the data signal from the first data signal terminal Vdata to the gate of the driving transistor DT, causing the voltage at the gate of the driving transistor DT to rise to meet the turn-on voltage of the driving transistor DT. In the luminescence phase, the driving transistor DT is turned on, forming the circuit loop with the first power supply terminal VDD, the light-emitting device L, and the second power supply terminal VSS, and the light-emitting device L begins to emit light. To ensure the continuous conduction of the driving transistor DT, the first storage capacitor C stores the voltage at the gate of the driving transistor DT, ensuring the continuous luminescence of the light-emitting device L during the luminescence phase. After the light-emitting device L has been emitting light for a period, the second transistor T2 is turned on, providing the pull-down signal from the second data signal terminal Vini to the gate of the driving transistor DT, reducing the voltage at the gate of the driving transistor DT and causing the driving transistor DT to switch from the conductive state to the cutoff state, and the light-emitting device L stops emitting light.

The pixel driving circuit may also include a reset phase, which can occur before the data signal writing phase. During the reset phase, the third transistor T3 is turned on, providing the reset signal from the reset signal terminal Vref to the drain of the driving transistor DT to reset the voltage at the drain of the driving transistor DT.

The pixel driving circuit may also include an external compensation phase, which can occur after the data signal writing phase and between the luminescence phases. During the external compensation phase, the third transistor T3 is turned on, providing the external compensation signal from the external compensation device DAC to the drain of the driving transistor DT to compensate for the gate-source voltage difference of the driving transistor DT.

To realize the light-emitting device L to display any grayscale value between L128 and L255, the light-emitting device L is controlled to emit light only in the eighth sub-display period by adjusting the voltage value of the data signal output from the first data signal terminal Vdata during the eighth sub-display period. However, the PAM driving method, which only adjusts the voltage value of the data signal, can still result in the smaller driving current of the light-emitting device L, leading to uneven brightness and flicker issues when displaying.

Figure 3:
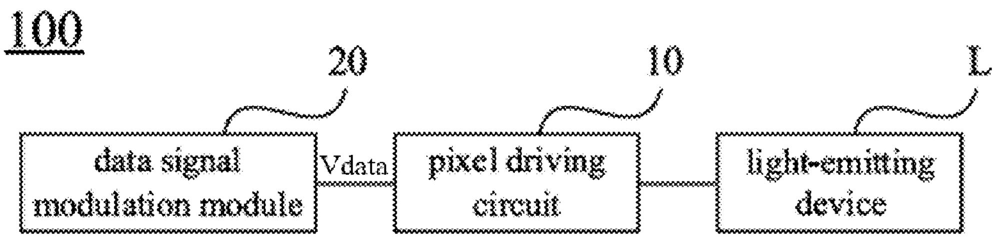
FIG. 3 is a block diagram of the display panel provided by one or more embodiments of the present application.

To address the above issues, as shown in FIG. 3, the present application provides the display panel 100, which includes the light-emitting device L, the pixel driving circuit 10, and the data signal modulation module 20.

The light-emitting device L can be at least one of the organic light-emitting diode, the mini light-emitting diode, and the micro semiconductor light-emitting diode. For ease of understanding, the pixel driving circuit 10 in this embodiment is illustrated based on the 4T1C architecture shown in FIG. 2. However, the pixel driving circuit 10 provided in the embodiments of the present application is not limited to the 4T1C architecture. The number of transistors included in the pixel driving circuit 10 can be greater than or equal to 4, and correspondingly, the number of storage capacitors included in the pixel driving circuit 10 can be greater than or equal to 1, as long as the pixel driving circuit 10 includes at least the driving transistor DT, the first transistor T1, the second transistor T2, and the storage capacitor C as shown in FIG. 2.

Figure 4:
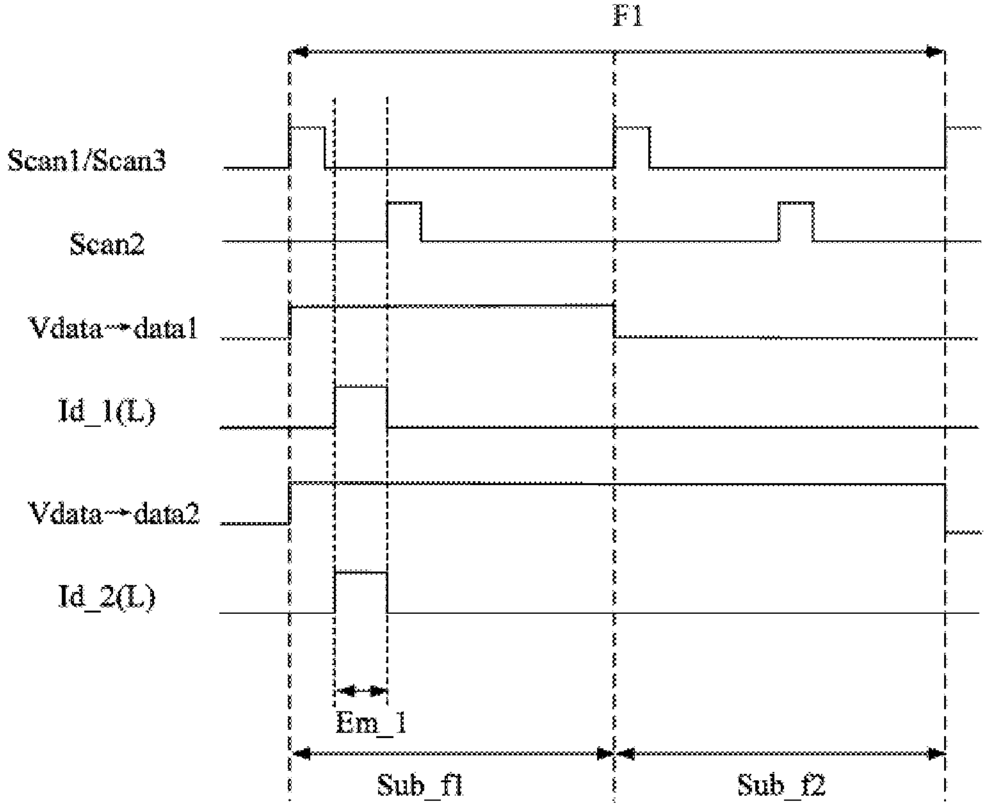
FIG. 4 is a first timing diagram of the pixel driving circuit driving the light-emitting device to emit light provided by one or more embodiments of the present application.

As shown in FIG. 4, the display period F1 of one frame displayed by the light-emitting device L in this embodiment includes at least the first and second sub-display periods Sub_f1 and Sub_f2 that follow one another. The first scanning signal terminal Scan1 of the pixel driving circuit 10 is used to receive the first scanning signal that turns on the first transistor T1 during any sub-display period. As shown in FIG. 2, the first transistor T1 is an N-type transistor. The gate of the N-type transistor is turned on when it receives the first scanning signal which is a high-level signal, so the first scanning signal output from the first scanning signal terminal Scan1 shown in FIG. 4 is a high-level signal during the period when the first transistor T1 is conductive.

The first data signal terminal of the pixel driving circuit 10 is used to receive the data signal that turns on the driving transistor DT and controls the light-emitting device L to emit light at least during the first sub-display period Sub_f1. As shown in FIG. 2, the driving transistor DT is an N-type transistor. The gate of the N-type transistor becomes conductive when it receives the data signal that is a high-level signal. So the data signal output from the first data signal terminal Vdata shown in FIG. 4 and turning on the driving transistor DT, is a high-level signal.

The second scanning signal terminal Scan2 of the pixel driving circuit 10 is used to receive the second scanning signal that turns on the second transistor T2 during any sub-display period. As shown in FIG. 2, the second transistor T2 is an N-type transistor. The gate of the N-type transistor becomes conductive when it receives the second scanning signal that is a high-level signal, so the second scanning signal output from the second scanning signal terminal Scan2 shown in FIG. 4 is a high-level signal during the period when the second transistor T2 is conductive.

The third scanning signal terminal Scan3 of the pixel driving circuit 10 is used to receive the third scanning signal that turns on the third transistor T3 during any sub-display period. As shown in FIG. 2, the third transistor T3 is a P-type transistor. The gate of the P-type transistor becomes conductive when it receives the third scanning signal that is a low-level signal, so the third scanning signal output by the third scanning signal terminal Scan3 shown in FIG. 4 is a low-level signal during the period when the third transistor T3 is conductive.

The data signal modulation module 20 of the display panel 100 is electrically connected to the first data signal terminal Vdata of the pixel driving circuit 10. The data signal modulation module 20 is used to obtain a pending grayscale value for the light-emitting device L to display, and provides, according to the pending grayscale value, the data signal corresponding to the pending grayscale value to the first data signal terminal Vdata. That is, in the display panel 100 provided in this embodiment, the data signal modulation module 20 first obtains the pending grayscale value for the light-emitting device L to display, and then adjusts the duty cycle and voltage value of the data signal that turns on the driving transistor DT according to the magnitude of the pending grayscale value, ensuring that the light-emitting device L can stably display multiple grayscales from L0 to L255, reducing the flicker or mottling issues when the light-emitting device L displays the pending grayscale value.

The data signal modulation module 20 can be the Field Programmable Gate Array (FPGA) circuit, which is electrically connected to the driving chip of the display panel to obtain the pending grayscale value(s) of the light-emitting device.

Please continue to refer to FIG. 4. The data signal modulation module 20 is used to obtain the pending grayscale value for the light-emitting device L to display, and to determine whether the pending grayscale value is the first grayscale value, and to provide the data signal corresponding to the first grayscale value to the first data signal terminal Vdata during the first sub-display period Sub_f1 when the pending grayscale value is the first grayscale value. That is, when the data signal modulation module 20 determines that the pending grayscale value is the first grayscale value, it only outputs the data signal that turns on the driving transistor DT during the first sub-display period Sub_f1.

Alternatively, the data signal modulation module 20 is used to obtain the pending grayscale value, determine whether the pending grayscale value is the second grayscale value, and provide the data signal corresponding to the second grayscale value to the first data signal terminal Vdata during the first sub-display period Sub_f1 and the second sub-display period Sub_f2 when the pending grayscale value is the second grayscale value. That is, when the data signal modulation module 20 determines that the pending grayscale value is the second grayscale value, it outputs the data signal that turns on the driving transistor DT during both the first sub-display period Sub_f1 and the second sub-display period Sub_f2.

The first grayscale value is the grayscale value that is less than or equal to the first grayscale threshold value, and the second grayscale value is the grayscale value that is greater than the first grayscale threshold value. The value of the first grayscale threshold value can be selected as needed, taking the example where 8-bit binary numbers represent the divided 256 grayscales according to the degree of brightness for display, the first grayscale threshold value can be any grayscale value from L0 to L255, excluding the minimum grayscale value L0 and the maximum grayscale value L255.

In FIG. 4, Id_1(L) refers to the driving current of the light-emitting device L when displaying the first grayscale value, and Id_2(L) refers to the driving current of the light-emitting device L when displaying the second grayscale value.

Figure 5:
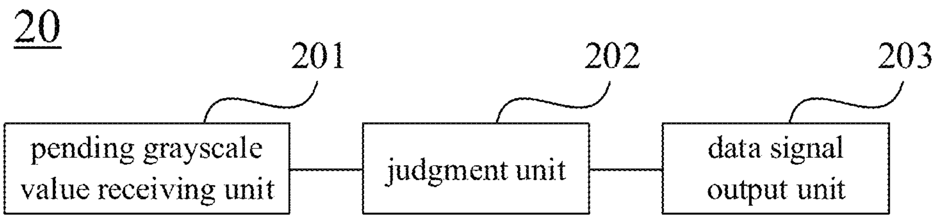
FIG. 5 is a block diagram of the data signal modulation module.

As shown in FIG. 5, the data signal modulation module 20 includes the pending grayscale value receiving unit 201, the judgment unit 202, and the data signal output unit 203. The pending grayscale value receiving unit 201 is used to obtain the pending grayscale value of the light-emitting device, the judgment unit 202 compares the pending grayscale value with the first grayscale threshold value and outputs the comparison result, and the data signal output unit 203 provides the data signal corresponding to the pending grayscale value to the first data signal terminal Vdata based on the comparison result provided by the judgment unit 202. Depending on the different pending grayscale values of the light-emitting device L, at least one of the voltage value of the data signal output by the data signal output unit 203 and the duty cycle of the data signal turning on the driving transistor DT is different.

In some embodiments provided by the present application, the first grayscale value includes at least the first sub-grayscale value and the second sub-grayscale value greater than the first sub-grayscale value. The data signal modulation module 20 provides the first data signal to the first data signal terminal Vdata during the first sub-display period Sub_f1 when the first grayscale value is the first sub-grayscale value. The data signal modulation module 20 provides the second data signal to the first data signal terminal Vdata during the first sub-display period Sub_f1 when the first grayscale value is the second sub-grayscale value.

Figure 6:
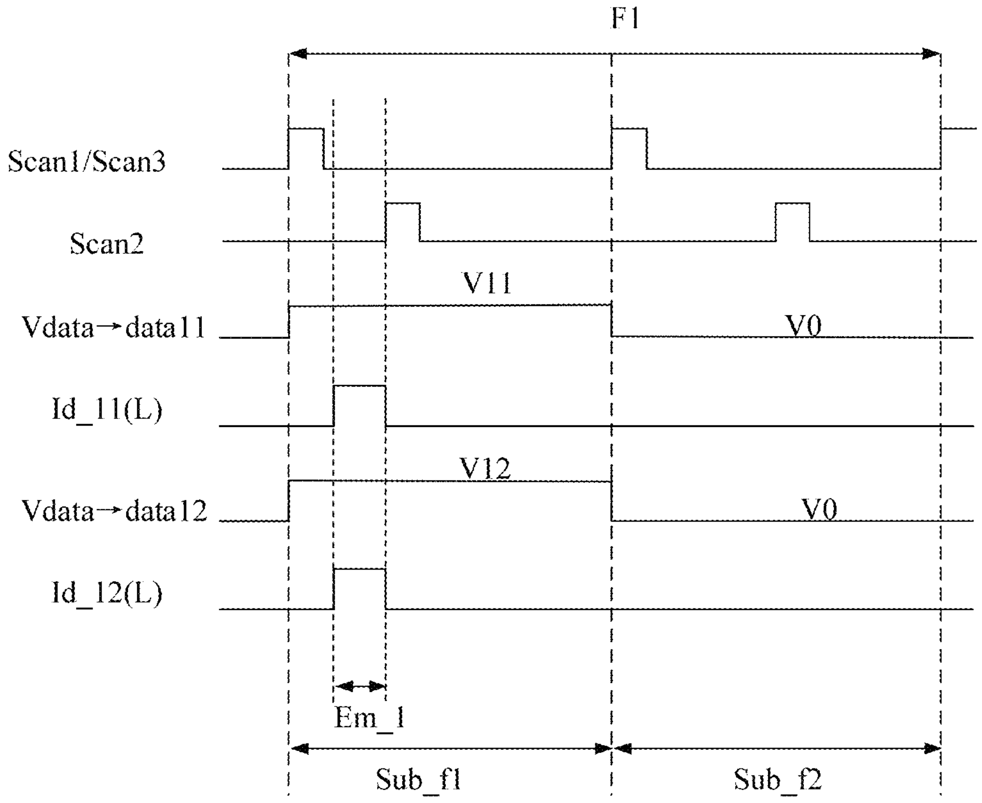
FIG. 6 is a second timing diagram of the pixel driving circuit driving the light-emitting device to emit light provided by one or more embodiments of the present application.

As shown in FIG. 6, taking the range of the first grayscale value being L0~L60 as an example, when the first sub-grayscale value of the light-emitting device L is L24, the first data signal terminal Vdata receives the first data signal data11 provided by the data signal modulation module 20. The first data signal data11 has the first voltage value V11 during the first sub-display period Sub_f1, and the voltage value of the first data signal data11 is 0V in the sub-display periods other than the first sub-display period Sub_f1, for example, the voltage value of the first data signal data11 in the second sub-display period Sub_f2 is 0V.

When the second sub-grayscale value of the light-emitting device L is L32, the first data signal terminal Vdata receives the second data signal data 12 provided by the data signal modulation module 20. The second data signal data 12 has the second voltage value V12 during the first sub-display period Sub_f1, and the second voltage value V12 is greater than the first voltage value V11. The voltage value of the second data signal data 12 is V0 in the sub-display periods other than the first sub-display period Sub_f1, for example, the voltage value of the second data signal data 12 in the second sub-display period Sub_f2 is V0.

The duration of the first data signal data11 with the first voltage value V11 in the display period F1 of one frame displayed by the light-emitting device L is the duration of the first sub-display period Sub_f1. Therefore, the duration of the first data signal data11 being output to the driving transistor DT depends on the conduction duration of the first transistor T1 during the first sub-display period Sub_f1, that is, it depends on the duration of the first scanning signal turning on the first transistor T1 during the first sub-display period Sub_f1.

The duration of the second data signal data12 with the second voltage value V12 in the display period F1 of the frame displayed by the light-emitting device Lis the duration of the first sub-display period Sub_f1. Therefore, the duration of the second data signal data12 being output to the driving transistor DT depends on the conduction duration of the first transistor T1 during the first sub-display period Sub_f1, that is, it depends on the duration of the first scanning signal turning on the first transistor T1 during the first sub-display period Sub_f1.

In FIG. 6, Id_11(L) refers to the driving current of the light-emitting device L when displaying the first sub-grayscale value, and Id_12(L) refers to the driving current of the light-emitting device L when displaying the second sub-grayscale value.

In some embodiments provided by the present application, the second grayscale value includes at least the third sub-grayscale value and the fourth sub-grayscale value greater than the third sub-grayscale value. The data signal modulation module 20 is used to provide the third data signal to the first data signal terminal Vdata during the first sub-display period Sub_f1 and the second sub-display period Sub_f2 when the second grayscale value is the third sub-grayscale value. The data signal modulation module 20 is used to provide the fourth data signal to the first data signal terminal Vdata during the first sub-display period Sub_f2 when the second grayscale value is the fourth sub-grayscale value.

Figure 7:
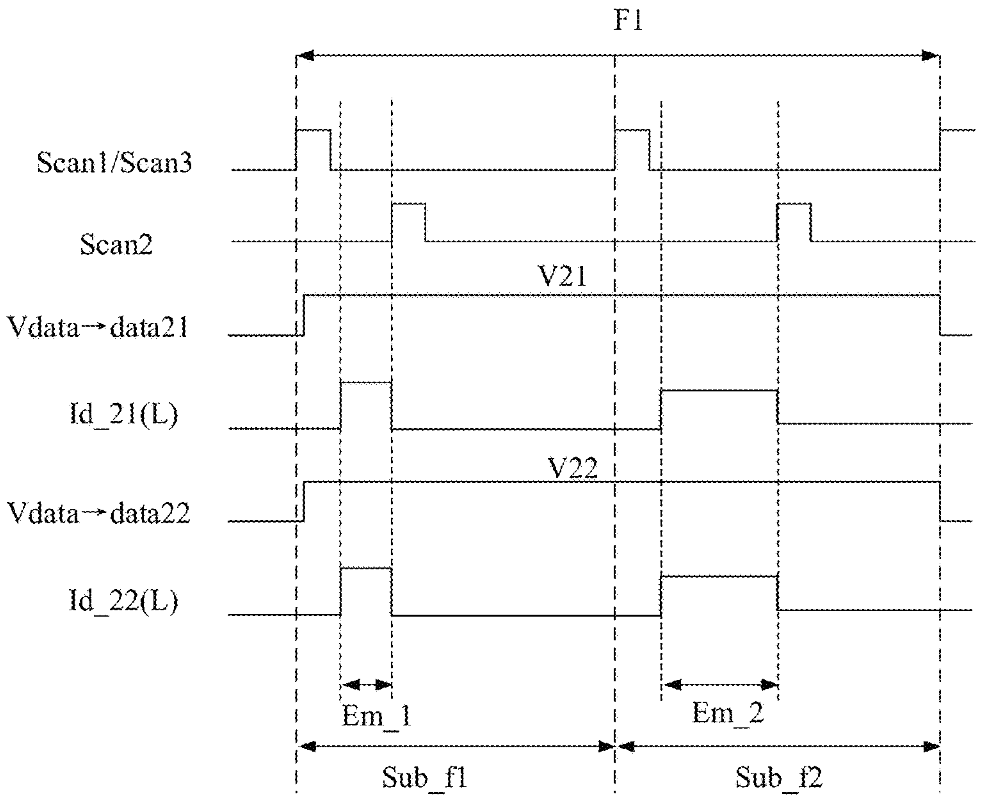
FIG. 7 is a third timing diagram of the pixel driving circuit driving the light-emitting device to emit light provided by one or more embodiments of the present application.

As shown in FIG. 7, taking the range of the second grayscale value being L61~L255 as an example, when the third sub-grayscale value of the light-emitting device L is L90, the first data signal terminal Vdata receives the third data signal data21 provided by the data signal modulation module 20, and the third data signal data21 has the third voltage value V21 during the first sub-display period Sub_f1, and also has the third data signal data21 during the second sub-display period Sub_f2.

When the fourth sub-grayscale value of the light-emitting device L is L95, the first data signal terminal Vdata receives the fourth data signal data22 provided by the data signal modulation module 20, and the fourth data signal data22 has the fourth voltage value V22 during the first sub-display period Sub_f1, and the fourth voltage value V22 is greater than the third voltage value V21. The fourth data signal data22 also has the fourth voltage value V22 during the second sub-display period Sub_f2.

The duration of the third data signal data21 with the third voltage value V21in the display period F1 of the frame displayed by the light-emitting device L is the same as the duration of the display period F1. Therefore, the duration of the third data signal data21 being output to the driving transistor DT depends on the conduction duration of the first transistor T1 during the first sub-display period Sub_f1 and the second sub-display period Sub_f2, that is, it depends on the duration of the first scanning signal turning on the first transistor T1 during the first sub-display period Sub_f1 and the second sub-display period Sub_f2.

The duration of the fourth data signal data22 with the fourth voltage value V22 in the display period F1 of the frame displayed by the light-emitting device L is the same as the duration of the display period F1. Therefore, the duration of the fourth data signal data22 being output to the driving transistor DT depends on the conduction duration of the first transistor T1 during the first sub-display period Sub_f1 and the second sub-display period Sub_f2, that is, it depends on the duration of the first scanning signal turning on the first transistor T1 during the first sub-display period Sub_f1 and the second sub-display period Sub_f2.

In FIG. 7, Id_21(L) refers to the driving current of the light-emitting device L when displaying the third sub-grayscale value, and Id_22(L) refers to the driving current of the light-emitting device L when displaying the fourth sub-grayscale value.

In some embodiments provided by the present application, the second grayscale value includes at least the third sub-grayscale value and the fourth sub-grayscale value greater than the third sub-grayscale value. The data signal modulation module 20 is used to provide the third data signal to the first data signal terminal Vdata during the first sub-display period Sub_f1 and the second sub-display period Sub_f2 when the second grayscale value is the third sub-grayscale value. The data signal modulation module 20 is used to provide the fourth data signal to the first data signal terminal Vdata during the first sub-display period Sub_f2 when the second grayscale value is the fourth sub-grayscale value.

Figure 8:
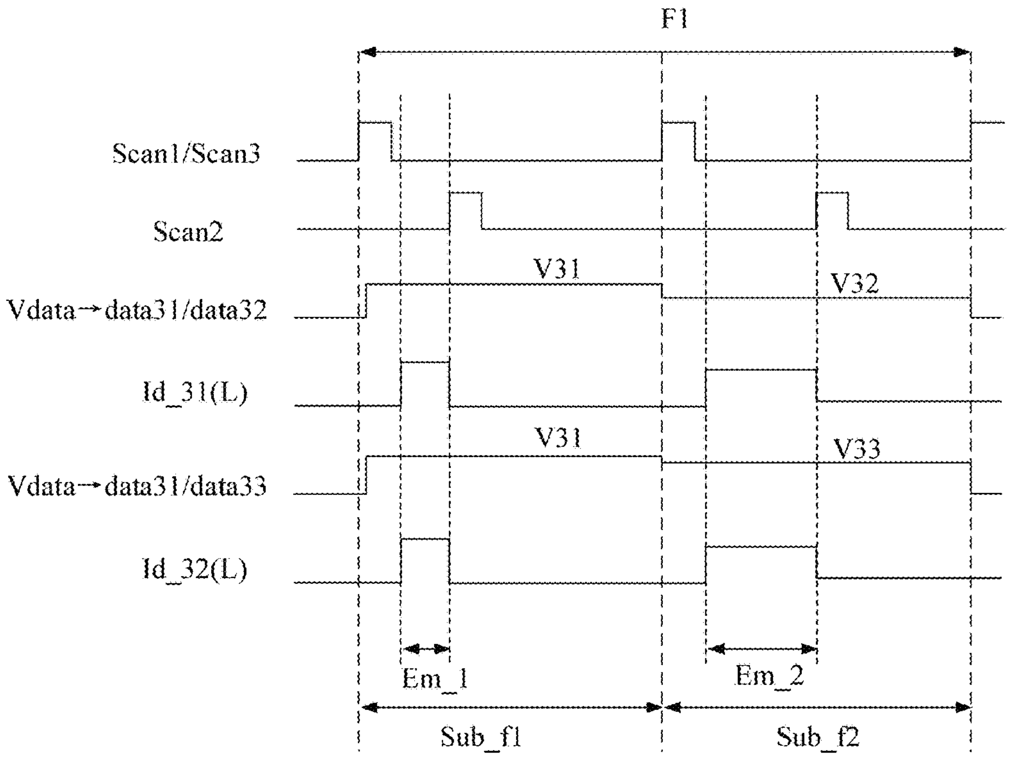
FIG. 8 is a fourth timing diagram of the pixel driving circuit driving the light-emitting device to emit light provided by one or more embodiments of the present application.

As shown in FIG. 8, taking the range of the second grayscale value being L61~L255 as an example, when the third sub-grayscale value of the light-emitting device L is L90, the first data signal terminal Vdata receives the fifth data signal data31 provided by the data signal modulation module 20 during the first sub-display period Sub_f1, and the first data signal terminal Vdata receives the sixth data signal data32 provided by the data signal modulation module 20 during the second sub-display period Sub_f2. The fifth data signal data31 has the fifth voltage value V31 during the first sub-display period Sub_f1, and the sixth data signal data32 has the sixth voltage value V32 during the second sub-display period Sub_f2.

When the fourth sub-grayscale value of the light-emitting device L is L95, the first data signal terminal Vdata receives the fifth data signal data31 provided by the data signal modulation module 20 during the first sub-display period Sub_f1, and the first data signal terminal Vdata receives the seventh data signal data33 provided by the data signal modulation module 20 during the second sub-display period Sub_f2. The seventh data signal data33 has the seventh voltage value V33 during the second sub-display period Sub_f2. The sixth voltage value V32 is less than the seventh voltage value V33, and the fifth voltage value V31 is not zero.

The duration of the fifth data signal data31 with the fifth voltage value V31 in the display period F1 of the frame displayed by the light-emitting device L is the same as the duration of the first sub-display period Sub_f1. Therefore, the duration of the fifth data signal data31 being output to the driving transistor DT depends on the conduction duration of the first transistor T1 during the first sub-display period Sub_f1, that is, it depends on the duration of the first scanning signal turning on the first transistor T1 during the first sub-display period Sub_f1.

The duration of the sixth data signal data32 with the sixth voltage value V32 in the display period F1 of the frame displayed by the light-emitting device L is the same as the duration of the second sub-display period Sub_f2. Therefore, the duration of the sixth data signal data32 being output to the driving transistor DT depends on the conduction duration of the first transistor T1 during the second sub-display period Sub_f2, that is, it depends on the duration of the first scanning signal turning on the first transistor T1 during the second sub-display period Sub_f2.

The duration of the seventh data signal data33 with the seventh voltage value V33 in the display period F1 of the frame displayed by the light-emitting device Lis the same as the duration of the second sub-display period Sub_f2. Therefore, the duration of the seventh data signal data33 being output to the driving transistor DT depends on the conduction duration of the first transistor T1 during the second sub-display period Sub_f2, that is, it depends on the duration of the first scanning signal turning on the first transistor T1 conductive during the second sub-display period Sub_f2.

In FIG. 8, Id_31(L) refers to the driving current of the light-emitting device L when displaying the third sub-grayscale value, and Id_32(L) refers to the driving current of the light-emitting device L when displaying the fourth sub-grayscale value.

Figure 9:
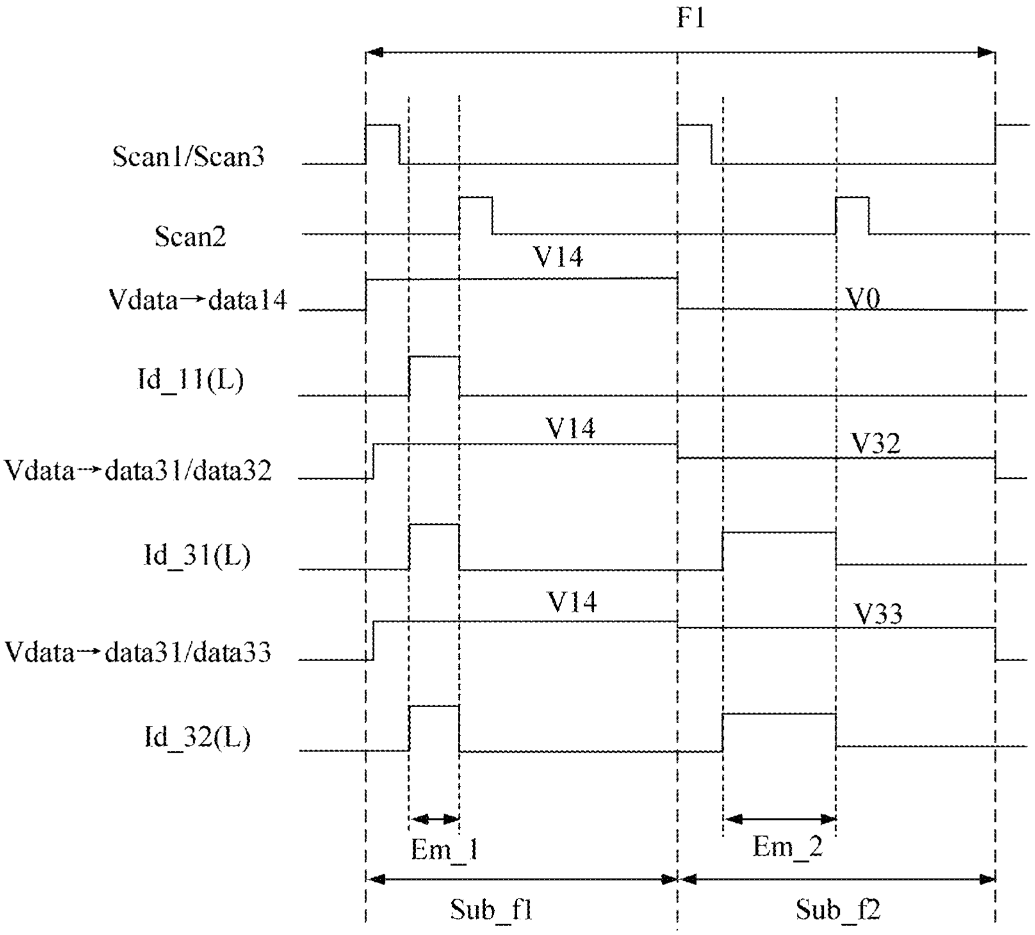
FIG. 9 is a fifth timing diagram of the pixel driving circuit driving the light-emitting device to emit light provided by one or more embodiments of the present application.

As shown in FIG. 9, the difference between FIG. 9 and FIG. 8 is that the data signal modulation module 20 in FIG. 9 provides the fifth data signal to the first data signal terminal Vdata during the first sub-display period Sub_f1, and the voltage value of the fifth data signal is the same as the voltage value of the first threshold data signal. The first threshold data signal is the data signal provided by the data signal modulation module 20 to the first data signal terminal Vdata when the pending grayscale value is the first grayscale threshold value.

Taking the first grayscale threshold value being L60 as an example, when the pending grayscale value of the light-emitting device L is L60, the first data signal terminal Vdata receives the first threshold data signal data14 provided by the data signal modulation module 20, and the first threshold data signal data14 has an eighth voltage value V14 during the first sub-display period Sub_f1. Therefore, when the third sub-grayscale value of the light-emitting device L is L90, the first data signal terminal Vdata receives the first threshold data signal data 14 provided by the data signal modulation module 20 during the first sub-display period Sub_f1, and the first threshold data signal data 14 has the eighth voltage value V14 during the first sub-display period Sub_f1. Similarly, when the fourth sub-grayscale value of the light-emitting device Lis L95, the first data signal terminal Vdata receives the first threshold data signal data14 provided by the data signal modulation module 20 during the first sub-display period Sub_f1, and the first threshold data signal data14 has the eighth voltage value V14 during the first sub-display period Sub_f1.

In FIG. 9, Id_11(L) refers to the driving current of the light-emitting device L when displaying the first grayscale threshold value, Id_31(L) refers to the driving current of the light-emitting device L when displaying the third sub-grayscale value, and Id_32(L) refers to the driving current of the light-emitting device L when displaying the fourth sub-grayscale value.

Figure 10:
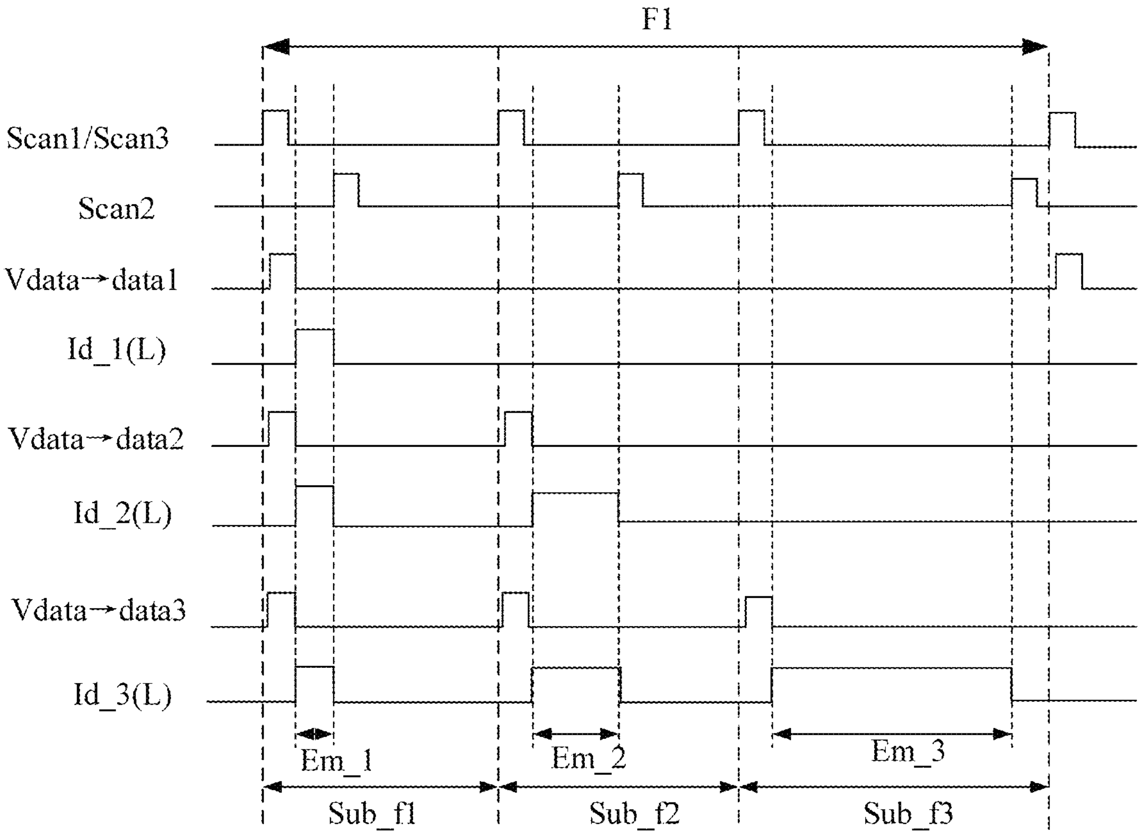
FIG. 10 is a sixth timing diagram of the pixel driving circuit driving the light-emitting device to emit light provided by one or more embodiments of the present application.

As shown in FIG. 10, the display period F1 of the frame displayed by the light-emitting device L also includes the third sub-display period Sub_f3, with the first sub-display period Sub_f1, the second sub-display period Sub_f2, and the third sub-display period Sub_f3 being consecutive. That is, in this embodiment, the display period F1 of the frame displayed by the light-emitting device L is divided into three consecutive sub-display periods.

The data signal modulation module is also used to determine whether the pending grayscale value is the third grayscale value and to provide the data signal corresponding to the third grayscale value during the first sub-display period, the second sub-display period, and the third sub-display period when the pending grayscale value is the third grayscale value. The third grayscale value is the grayscale value greater than the second grayscale threshold value, and the second grayscale value is the grayscale value greater than the first grayscale threshold value and less than or equal to the second grayscale threshold value.

The second grayscale threshold value can be selected as needed. Taking the example where an 8-bit pixel driving circuit corresponds to 256 grayscales divided according to the degree of brightness for display, the first grayscale threshold value can be any grayscale value from L0 to L255, excluding the minimum grayscale value L0 and the maximum grayscale value L255. The second grayscale threshold value can be any grayscale value from L0 to L255, excluding the maximum grayscale value L255, and greater than the first grayscale threshold.

In the display panel provided in this embodiment, on the basis that the display period F1 of the frame displayed by the light-emitting device L is divided into three consecutive sub-display periods, i.e., the first sub-display period Sub_f1, the second sub-display period Sub_f2, and the third sub-display period Sub_f3, the data signal modulation module 20 determines whether the pending grayscale value for the light-emitting device L to display is the first grayscale value, the second grayscale value, or the third grayscale value, and the data signal modulation module 20 outputs the data signal corresponding to the pending grayscale value in the corresponding sub-display period based on the determination result.

The eighth data signal data1 corresponding to the first grayscale value causes the light-emitting device L to emit light during the first sub-display period Sub_f1. The ninth data signal data2 corresponding to the second grayscale value causes the light-emitting device L to emit light during both the first sub-display period Sub_f1 and the second sub-display period Sub_f2. The tenth data signal data3 corresponding to the third grayscale value causes the light-emitting device L to emit light during the first sub-display period Sub_f1, the second sub-display period Sub_f2, and the third sub-display period Sub_f3.

As shown in FIG. 10, when the pending grayscale value is the first grayscale value, the light-emitting device L has the first light-emitting duration Em_1 in the first sub-display period Sub_f1, so the light-emitting duration of the light-emitting device L in the frame display period F1 is the first light-emitting duration Em_1. When the pending grayscale value is the second grayscale value, the light-emitting device L also has the second light-emitting duration Em_2 in the second sub-display period Sub_f2, so the light-emitting duration of the light-emitting device L in the frame display period F1 is the sum of the first light-emitting duration Em_1 and the second light-emitting duration Em_2. When the pending grayscale value is the third grayscale value, the light-emitting device L also has the third light-emitting duration Em_3 during the third sub-display period Sub_f3, so the light-emitting duration of the light-emitting device L in the frame display period F1 is the sum of the first light-emitting duration Em_1, the second light-emitting duration Em_2, and the third light-emitting duration Em_3. That is, the data signal modulation module 20 outputs the corresponding data signal according to the magnitude of the pending grayscale value to adjust the light-emitting duration of the light-emitting device L.

Taking the first grayscale threshold value being L84 and the second grayscale threshold value being L170 as an example, the range of the first grayscale value is L0~L84, the range of the second grayscale value is L85~L170, and the range of the third grayscale value is L171~L255. When the pending grayscale value is any grayscale value from L0 to L84, the light-emitting device L has the first light-emitting duration Em_1 in the first sub-display period Sub_f1, and based on the magnitudes of the different first grayscale values, the voltage values of the data signals corresponding to the first grayscale values are different. That is, the data signal modulation module 20 outputs the data signal with the corresponding voltage value according to the magnitude of the first grayscale value to adjust the light-emitting of the light-emitting device L.

As shown in FIG. 10, the first scanning signal turning on the first transistor T1 has the first duration $t_{01}$ in the first sub-display period Sub_f1, the second duration $t_{02}$ in the second sub-display period Sub_f2, and the third duration $t_{03}$ in the third sub-display period Sub_f3 which are the same, so that the conduction durations of the first transistor T1 in the first sub-display period Sub_f1, in the second sub-display period Sub_f2, and in the third sub-display period Sub_f3 are the same.

In FIG. 10, Id_1(L) refers to the driving current of the light-emitting device L when displaying the first grayscale value, Id_2(L) refers to the driving current of the light-emitting device L when displaying the second grayscale value, and Id_3(L) refers to the driving current of the light-emitting device L when displaying the third grayscale value.

Figure 11:
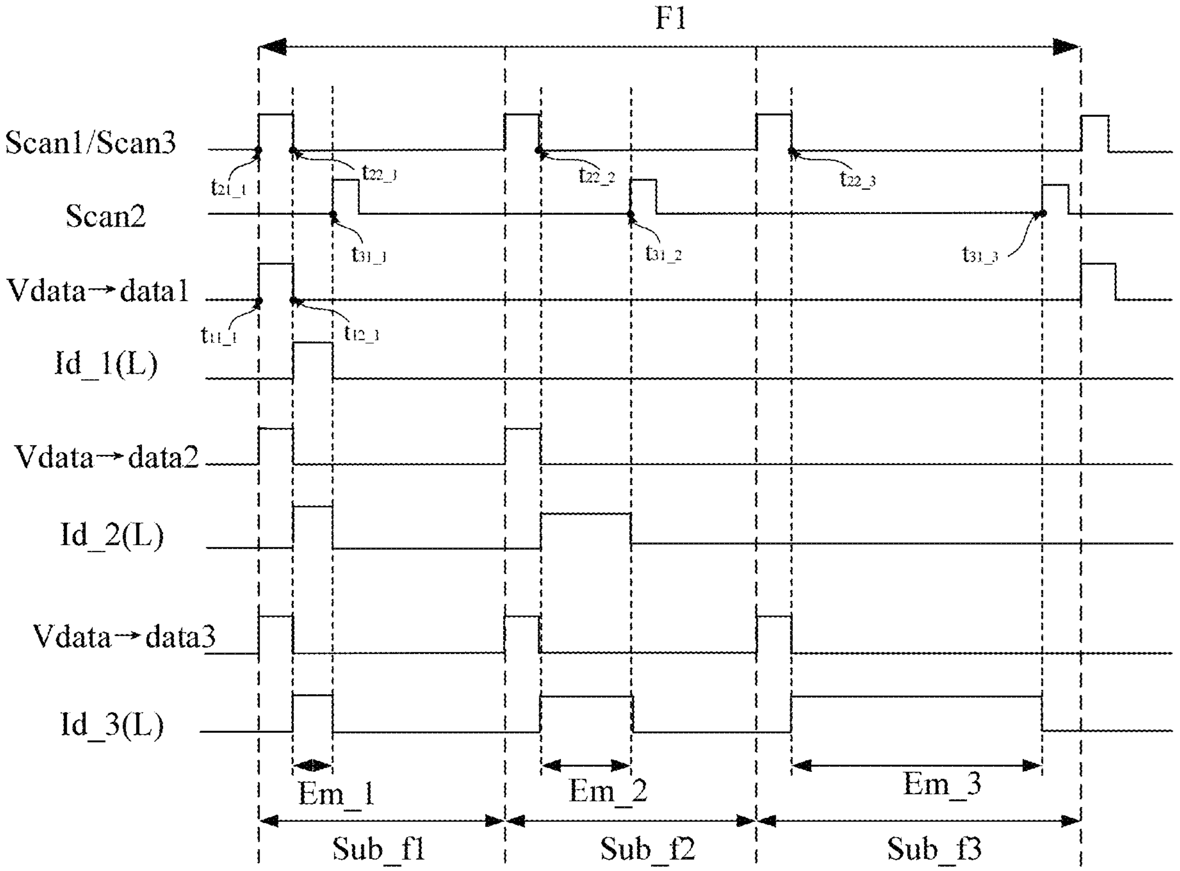
FIG. 11 is a seventh timing diagram of the pixel driving circuit driving the light-emitting device to emit light provided by one or more embodiments of the present application.

As shown in FIG. 11, during any sub-display period, the start time point $t_{11}$ of the data signal turning on the driving transistor DT is the same as the start time point $t_{21}$ of the first scanning signal turning on the first transistor T1, and the end time point $t_{12}$ of the data signal turning on the driving transistor DT is the same as the end time point $t_{22}$ of the first scanning signal turning on the first transistor T1. During any sub-display period, the duration of the data signal turning on the driving transistor DT conductive is the same as the duration of the first scanning signal turning on the first transistor T1. That is, during the period when the first transistor T1 is conductive, the first data signal terminal Vdata synchronously provides the data signal turning on the driving transistor DT.

In some embodiments provided by the present application, the first duration difference between the start time point $t_{31\_n}$ of the second scanning signal in the nth sub-display period and the end time point $t_{22\_n}$ of the first scanning signal in the nth sub-display period is $t_{31\_n}$-$t_{22\_n}$, and the second duration difference between the start time point $t_{31\_(n+1)}$ of the second scanning signal in the (n+1)th sub-display period and the end time point $t_{22\_(n+1)}$ of the first scanning signal in the (n+1)th sub-display period is $t_{31\_(n+1)}$-$t_{22\_(n+1)}$. The nth sub-display period and the (n+1)th sub-display period are two consecutive sub-display periods, and the first duration difference is less than the second duration difference, where n is an integer greater than or equal to 1.

That is to say, in different sub-display periods, the start time points of outputting signals at the second scanning signal terminal Scan2 turning on the second transistor T2 are later than the end time points of outputting signals at the first scanning signal terminal Scan1 turning on the first transistor T1 by different durations, resulting in different conduction durations of the driving transistor DT in different sub-display periods, and thus different light-emitting durations of the light-emitting device L in different sub-display periods.

This embodiment controls the first duration difference to be less than the second duration difference, making the conduction duration of the driving transistor DT in the nth sub-display period less than that in the (n+1)th sub-display period, and the light-emitting duration of the light-emitting device L in the nth sub-display period less than that in the (n+1)th sub-display period.

As shown in FIG. 11, taking the third grayscale value as an example of the pending grayscale value. In the first sub-display period Sub_f1, the duration difference between the start time point $t_{31\_1}$ of the signal output at the second scanning signal terminal Scan2 turning on the second transistor T2, and the end time point $t_{22\_1}$ of the signal output at the first scanning signal terminal Scan1 turning on the first transistor T1, is $t_{31\_1}$-$t_{22\_1}$. In the second sub-display period Sub_f2, the duration difference between the start time point $t_{31\_2}$ of the signal output at the second scanning signal terminal Scan2 turning on the second transistor T2 and the end time point $t_{22\_2}$ of the signal output at the first scanning signal terminal Scan1 turning on the first transistor T1 is $t_{31\_2}$-$t_{22\_2}$. In the third sub-display period Sub_f3, the duration difference between the start time point $t_{31\_3}$ of the signal output at the second scanning signal terminal Scan2 turning on the second transistor T2 and the end time point $t_{22\_3}$ of the signal output at the first scanning signal terminal Scan1 turning on the first transistor T1 is $t_{31\_3}$-$t_{22\_3}$. $t_{31\_1}-t_{22\_1}<t_{31\_2}-t_{22\_2}<t_{31\_3}-t_{22\_3}$. That is, the light-emitting duration Em_1 of the light-emitting device L in the first sub-display period Sub_f1 is $t_{31\_1}$-$t_{22\_1}$, the light-emitting duration Em_2 in the second sub-display period Sub_f2 is $t_{31\_2}$-$t_{22\_2}$, and the light-emitting duration Em_3 in the third sub-display period Sub_f3 is $t_{31\_3}$-$t_{22\_3}$, with Em_1<Em_2<Em_3.

In FIG. 11, Id_1(L) refers to the driving current of the light-emitting device L when displaying the first grayscale value, Id_2(L) refers to the driving current when displaying the second grayscale value, and Id_3(L) refers to the driving current when displaying the third grayscale value.

Of course, the present application can also have many other embodiments. Without departing from the spirit and essential points of the present application, those skilled in the art can make various corresponding changes and transformations according to the present application, but these corresponding changes and transformations should all fall within the scope of protection of the claims attached to the present application.

What is claimed is:

1. A display panel, comprising a data signal modulation module, a light-emitting device, and a pixel driving circuit, wherein the light-emitting device is electrically connected in a loop formed by a first power supply terminal and a second power supply terminal of the pixel driving circuit, and the pixel driving circuit comprises:

a driving transistor, a source of the driving transistor being electrically connected to the first power supply terminal, and a drain of the driving transistor being electrically connected to one terminal of the light-emitting device;

a first transistor, a gate of the first transistor being electrically connected to a first scanning signal terminal of the pixel driving circuit, a source of the first transistor being electrically connected to a first data signal terminal of the pixel driving circuit, and a drain of the first transistor being electrically connected to a gate of the driving transistor;

a storage capacitor, a first electrode plate of the storage capacitor being electrically connected to the gate of the driving transistor, and a second electrode plate of the storage capacitor being electrically connected to the drain of the driving transistor;

wherein, a display period of one frame displayed by the light-emitting device comprises consecutive sub-display periods comprising at least a first sub-display period and a second sub-display period, the first scanning signal terminal is configured to receive, in any of the first and second sub-display periods, a first scanning signal turning on the first transistor; and the first data signal terminal is configured to receive, in at least the first sub-display period, a data signal controlling the driving transistor to turn on; and the data signal modulation module is electrically connected to the first data signal terminal and is configured to obtain a pending grayscale value for the light-emitting device to display, and to provide the data signal to the first data signal terminal based on the pending grayscale value;

wherein the data signal modulation module is configured to obtain the pending grayscale value, and to determine whether the pending grayscale value is a first grayscale value, and configured to provide the data signal to the first data signal terminal in the first sub-display period when the pending grayscale value is the first grayscale value; or the data signal modulation module is configured to obtain the pending grayscale value, and to determine whether the pending grayscale value is a second grayscale value, and configured to provide the data signal to the first data signal terminal in both the first and the second sub-display periods when the pending grayscale value is the second grayscale value; and wherein, the second grayscale value is greater than a first grayscale threshold value, and the first grayscale value is less than or equal to the first grayscale threshold value.

2. The display panel according to claim 1, wherein the first grayscale value includes at least a first sub-grayscale value and a second sub-grayscale value, the first sub-grayscale value being less than the second sub-grayscale value;

the data signal modulation module is configured to provide a first data signal to the first data signal terminal in the first sub-display period when the first grayscale value is the first sub-grayscale value;

the data signal modulation module is configured to provide a second data signal to the first data signal terminal in the first sub-display period when the first grayscale value is the second sub-grayscale value; and wherein, a voltage value of the first data signal is less than a voltage value of the second data signal.

3. The display panel according to claim 1, wherein the second grayscale value comprises at least a third sub-grayscale value and a fourth sub-grayscale value, the third sub-grayscale value being less than the fourth sub-grayscale value;

the data signal modulation module is configured to provide a third data signal to the first data signal terminal in both the first and the second sub-display periods when the second grayscale value is the third sub-grayscale value;

the data signal modulation module is configured to provide a fourth data signal to the first data signal terminal in both the first and the second sub-display periods when the second grayscale value is the fourth sub-grayscale value; and wherein, a voltage value of the third data signal is less than a voltage value of the fourth data signal.

4. The display panel according to claim 1, wherein the second grayscale value comprises at least a third sub-grayscale value and a fourth sub-grayscale value, the third sub-grayscale value being less than the fourth sub-grayscale value;

the data signal modulation module is configured to provide a fifth data signal in the first sub-display period and a sixth data signal during the second sub-display period to the first data signal terminal when the second grayscale value is the third sub-grayscale value;

the data signal modulation module is configured to provide the fifth data signal during the first sub-display period and a seventh data signal during the second sub-display period to the first data signal terminal when the second grayscale value is the fourth sub-grayscale value; and wherein a voltage value of the fifth data signal is non-zero, and a voltage value of the sixth data signal is less than a voltage value of the seventh data signal.

5. The display panel according to claim 4, wherein the voltage value of the fifth data signal is the same as a voltage value of a first threshold data signal, the first threshold data signal is the data signal provided by the data signal modulation module to the first data signal terminal when the pending grayscale value is the first grayscale threshold.

6. The display panel according to claim 1, wherein the display period of the frame displayed by the light-emitting device further comprises a third sub-display period, the first, second, and third sub-display periods being consecutive;

the data signal modulation module is further configured to obtain the pending grayscale value, and to determine whether the pending grayscale value is a third grayscale value, and configured to provide the data signal during the first, second, and third sub-display periods when the pending grayscale value is the third grayscale value; and wherein the third grayscale value is greater than a second grayscale threshold value, and the second grayscale value is greater than the first grayscale threshold value and less than or equal to the second grayscale threshold value.

7. The display panel according to claim 1, wherein durations of the first scanning signal turning on the first transistor are the same in any two of the sub-display periods.

8. The display panel according to claim 1, wherein in any one of the sub-display periods, a start time point of the data signal turning on the driving transistor is the same as a start time point of the first scanning signal turning on the first transistor, and an end time point of the data signal turning on the driving transistor is the same as an end time point of the first scanning signal turning on the first transistor conductive.

9. The display panel according to claim 1, wherein the pixel driving circuit further comprises a second transistor, a gate of the second transistor is electrically connected to a second scanning signal terminal of the pixel driving circuit, a source of the second transistor is electrically connected to a second data signal terminal of the pixel driving circuit, and a drain of the second transistor is electrically connected to the gate of the driving transistor, the second scanning signal terminal is configured to output a second scanning signal turning on the second transistor during any one of the sub-display periods; and wherein a first time difference between a start time point of the second scanning signal in an nth sub-display period of the sub-display periods and an end time point of the first scanning signal in the nth sub-display period is less than a second time difference between a start time point of the second scanning signal in a (n+1)th sub-display period of the sub-display periods and an end time point of the first scanning signal in the (n+1)th sub-display period, where n is an integer greater than or equal to 1.

* * * * *